Figure 1:
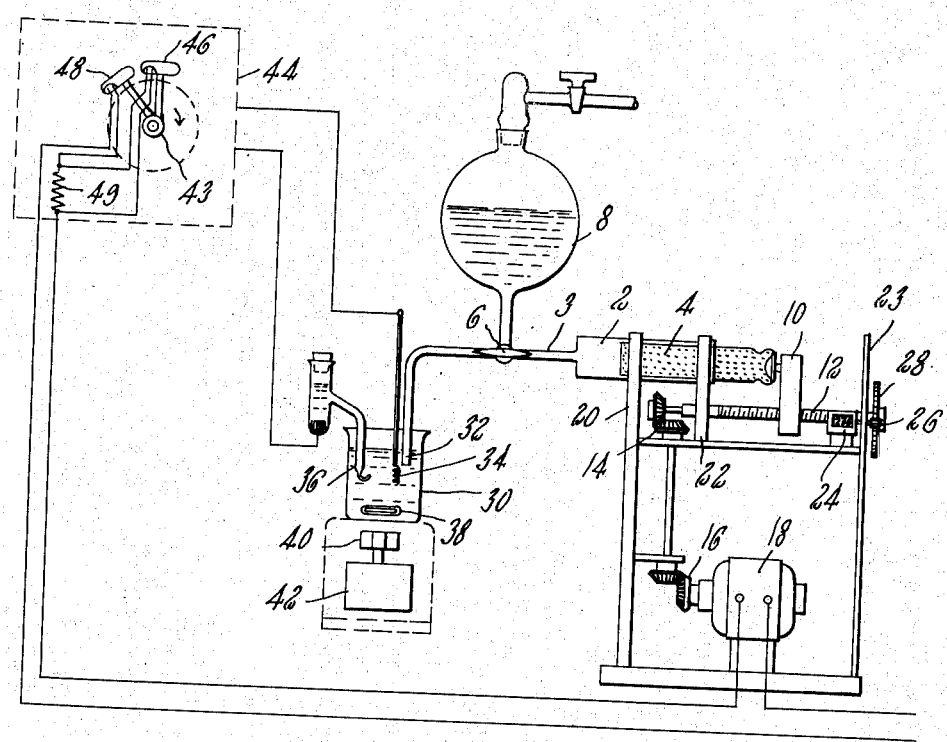

Aug. 25, 1953

J. J. LINGANE 2,650,256

AUTOMATIC ELECTROMETRIC TITRATION APPARATUS

Filed Dec. 14, 1948

Inventor
James J. Lingane
by Wright, Brown, Quinby
 & Way
Attys.

Patented Aug. 25, 1953

2,650,256

UNITED STATES PATENT OFFICE 2,650,256

AUTOMATIC ELECTROMETRIC TITRATION APPARATUS

James J. Lingane, Cambridge, Mass., assignor of one-third to Kenneth W. Brown, Cambridge, Mass.

Application December 14, 1948, Serial No. 65,273

8 Claims. (Cl. 23—253)

This invention relates to chemical analyzing devices and methods of chemical analysis. More particularly it relates to means for, and methods of, performing electrometric titrations; i. e., those wherein the completion of the reaction is indicated by an electrical instrument, such as a potentiometer, a current meter, a resistance meter, etc.

Titration is a process of quantitative analysis of chemical solutions in which a known volume of a standard solution is caused to react chemically with a selected constituent of a given sample in a solution under investigation. The completion of the reaction may be indicated in various ways. There may be added to the solution, prior to commencing the titration, an otherwise non-reactive chemical indicator which will change in its color characteristics when the reaction is complete. Or a varying electrical potential, or current flow, may be produced between a pair of electrodes in the solution, and changes in the potential or current flow in, or electrical resistance of, the solution may be registered on a meter appropriate to the electrical characteristic utilized for the purpose. Such titrations are known generically as electrometric titrations; and, specifically, as potentiometric or amperometric or conductometric titrations, as the case may be.

In the disclosure of the invention which follows I have described and illustrated that embodiment which includes the combination and use of a potentiometer as the electrometric element of the apparatus, but without intent to exclude from the scope of protection which I claim, any equivalent electrometric means for showing the occurrence of the equivalence point in the performance of a titration.

With the aid of suitable electrodes almost any chemical solution can be caused to develop an electrical potential, which potential will change in the course of reaction with another appropriate chemical. Where such condition prevails titration may be performed by the potentiometric method. It is principally to the potentiometric method of titration that my invention relates and my invention will apply to all types of reactions and to all types of electrode combinations.

Titration generally, and potentiometric titration in particular, is an essential process for conducting many different types of quantitative chemical analysis. Titrations are universally performed both for chemical exploration and for quality control of industrial chemical products. A single laboratory may have occasion to perform hundreds of titrations daily.

In performing a potentiometric titration manually the operator permits the reactive solution of known concentration, which is generally called the titrant, to drip into the solution being investigated, which I refer to as the titrate, until the measured electrical potential shows that the reaction between the two solutions is completed, which is the equivalence point or end-point of the titration. The amount of substance being determined is then computed by well known relations from the measured volume of the titrant and its known concentration. As the prime requisite of any potentiometric titration is that the equivalence point potential of the particular reaction be known from theoretical calculation or empirical determination, the operator must stop the addition of titrant precisely when that potential has been reached as indicated by a potentiometer connected to the electrodes in the titration vessel. The accuracy and success of manual titration evidently depends in large measure on the alertness and responsiveness of the operator in stopping the flow of titrant at the exact equivalence point of the titration, and upon his patience in cautiously approaching, but not passing, the end-point. Therefore manual titration is subject to considerable "personal error," and the analytical result obtained thereby inevitably reflects to a greater or less degree the fallible judgment of the operator.

It is the principal object of my invention to provide apparatus which will perform any potentiometric titration with consistent objective accuracy, and with precision at least equal to that of the best manually performed titration of the same type, and which will complete such titration much more quickly than a manual operator for a given degree of accuracy.

It is also an object of my invention to provide apparatus which will perform each titration as a single operation without any supervision during the entire course of the titration.

It is a further object of my invention to provide apparatus which is easily adaptable to all types of reactions whether rapid or slow and whether developing a great or small change in potential at the equivalence point.

It is likewise an object of my invention to provide apparatus which will permit stopping the addition of titrant at substantially the exact equivalence point of the titration without overrunning the equivalence point.

It is a still further object of my invention to provide apparatus which will be capable of performing successive titrations of two or more substances successively in the same solution, and in the same operation.

In general the apparatus of my present invention comprises a titration vessel or cell containing reference and indicator electrodes, a titrant reservoir, means to expel titrant therefrom and a conduit for conveying the expelled titrant to the cell, a potentiometer or equivalent device to which the electrodes are connected, and switching devices operated by the potentiometer or equivalent device to control the delivery of titrant to the cell. The apparatus is so organized that in the initial stages of the titration the titrant is delivered rapidly and continuously, but as the potential of the cell begins to approach the equivalence point potential the rate of titrant delivery is decreased and, as the equivalence point is very closely approached, the titrant is delivered as a succession of very small increments until the equivalence point potential is reached, at which point the delivery of titrant is stopped finally. To insure attainment of the equivalence point without overrunning, provision is made for so placing the indicator electrode in the zone of titrant inflow that it is bathed by solution at a more advanced stage of the titration than the bulk of the solution in the vessel. The optimum placement of the electrode will depend upon the nature of the reaction in the particular titration. Means are also provided for registering the quantity (volume) of titrant solution added.

Figure 2:
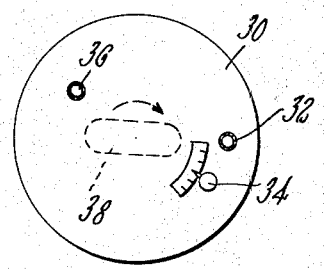
Figure 3:
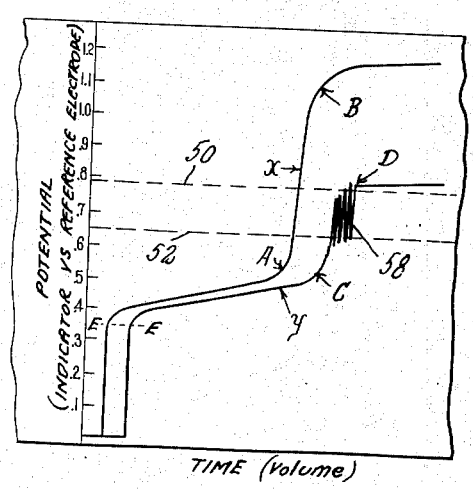

The invention will be best understood and appreciated by considering first the following description of apparatus comprising a preferred embodiment thereof, selected for purposes of illustration and shown in the accompanying drawings, in which, Fig. 1 is a diagrammatic view partly in elevation;

Fig. 2 is a plan view of the titration cell showing the relative positioning of the titrant dispensing tube and electrodes, and Fig. 3 is a chart bearing two representative curves drawn by a recording potentiometer comprising a component part of one embodiment of my invention. Curve $x$ in Fig. 3 represents the titration carried beyond the equivalence point and curve $y$ the same titration stopped at the equivalence point.

The apparatus includes a titration cell 30 containing the titrate solution, and provided with appropriate electrodes 34 and 36 connected in the usual manner to a potentiometer 44 of any suitable type or to an equivalent instrument. Titrant is supplied to cell 30 from syringe 2 through tube 3 which is provided with a capillary tip 32 at the outflow end. Syringe 2 is rigidly mounted in supports 20 and 22, and its plunger 4, which is closely fitted but freely movable, is driven by propeller 10. Propeller 10 contains an internally threaded passage which embraces and meshes with the threads of screw 12, by the rotation of which it is caused to travel forward or back. It is withheld from rotation by guide rails (not shown). Affixed to the right hand end of screw 12 is large gear 28 which drives revolution counter 24, whose reading indicates the volume of titrant dispensed from the syringe. Power to rotate screw 12 is supplied by electric motor 18 through the speed reducing gear units 14 and 16.

In operation the titrate solution containing the substance to be determined is placed in titration cell 30 and rapidly stirred. While any convenient means for stirring may be used I have found the well-known magnetic stirrer, consisting of a glass enclosed iron bar 38 resting on the bottom of the titration cell which is caused to rotate by a rotating permanent magnet 40 fixed on the end of the shaft of motor 42 below the cell, to be particularly suitable. The reading of counter 24 is noted, or printed if a printing type counter is used, and addition of titrant is begun by starting motor 18. The movement of plunger 4 expels titrant from the syringe and delivers it to the titrate in a fine stream through delivery tip 32 which is preferably a capillary tube and which extends beneath the surface of the titrate solution.

An important feature of my invention is this placement of the titrant delivery tip 32 beneath the surface of the titrate in order to permit delivery of titrant in less than drop size quantities. Delivery of discrete drops equivalent to the conventional 0.05 ml. limits the attainable precision to the order of magnitude of the drop size. By the use of a capillary outflow tip immersed in the titrate it is possible to obtain delivery of a mere fraction of a drop of titrant to achieve the highest accuracy. Furthermore the position of tip 32 below the surface of the titrate permits of a continuous inflow of titrant in the initial stages of the titration, thus facilitating optimum placement of indicator electrode 34 as will hereinafter appear.

Closely adjacent to outflow tip 32 and at a distance therefrom determined by the nature of the particular titration reaction is placed indicator electrode 34 consisting of platinum, silver, or other metal wire or other potential detecting device, appropriate to the titration. Immersed elsewhere in the titrate solution is reference electrode 36 which may be of the saturated calomel or any other suitable type. The positioning of reference electrode 36 is optional. However, as will be developed hereinafter, the distance between indicator electrode 34 and outflow tip 32 is critical and is varied to suit the characteristics of the particular titration reaction. In general, the distance between outflow tip 32 and indicator electrode 34 must be so chosen that the electrode will properly anticipate the equivalence point; the criterion of proper positioning being intermittent action of the syringe, and consequent incremental delivery of titrant, as the equivalence point is closely approached.

Titrant is stored in flask 8 or other suitable container from which syringe 2 is filled as required by positioning three-way stopcock 6 to connect the syringe to the storage flask and by operating motor 18 in reverse.

The volume of titrant solution used in any given titration will, of course, depend upon the quantity of the substance being determined that is present in the titrate solution in cell 30. The volume of titrant required for the titration need not vary more than between a few cubic centimeters and 50 cc. I have obtained excellent results by using a syringe of 50 cc. capacity, but a syringe of greater or lesser capacity may be used. It is of course necessary, whatever size of syringe is used, that the apparatus be calibrated in order that the volume corresponding to each revolution of the counter shaft, or "count," will be known. The gear ratios and the pitch of lead screw 12, in the illustrated apparatus, are so chosen with respect to the shaft speed of motor 18 that the maximum rate of titrant delivery is about 5 cc. per minute when a 50 cc. syringe is employed, but the exact rate of delivery of titrant is not critical. Counter 24 should be driven at a faster speed than lead screw 12 in order to obtain the desired degree of precision. I have found that with gear ratios such that one revolution of lead screw shaft 12 produced 66.67 counts, each count corresponded to 0.006132 cc. and very satisfactory results were obtained. Almost any desired greater or lesser degree of precision may be obtained by using appropriately different gear ratios.

Before titration is commenced potentiometer 44 is adjusted in the well known manner to accommodate the range of potential developed in the particular titration. In Fig. 3 the potential of the titration cell before addition of titrant is shown at line E—E. During the initial stage of titration the potential change is slight but it increases as the equivalence point is approached and changes most rapidly in the neighborhood of the equivalence point. This rapid change in potential at the equivalence point is illustrated by that portion of curve $x$ in Fig. 3 between points A and B.

It is of course old in the art to record titration curves by means of a recording potentiometer. Curve $x$ of Fig. 3 is typical of such a titration curve. However, as the titration has passed beyond the equivalence point in such a case the amount of titrant just sufficient to complete the reaction can only be estimated by measurement along the abscissa from the starting point to the inflection point of the curve as at dashed line 50. This method is not capable of high accuracy.

On the other hand I have found that the highest degree of accuracy is obtainable when the titration is stopped at the exact equivalence point. This is made possible by adding titrant in small increments as the equivalence point is approached. It is this incremental addition or tentative approach to the equivalence point and the novel means by which I accomplish it that constitutes the principal features of my invention.

One form of apparatus for controlling and stopping the delivery of titrant is illustrated in Fig. 1. Employing a potentiometer 44 having a revolving shaft or drum 43 to drive the slide wire contact I clamp two mercury tip switches 46 and 48 to the drum. As here shown switch 48 is connected in series with the power circuit to motor 18, and the circuit also contains a resistance 49 which is short circuited by switch 46. When both switches are closed, motor 18 will operate at full speed, but the opening of switch 46 puts resistance 49 into the line to slow the motor 18, and the opening of switch 48 will stop the motor. By positioning switch 46 to open at a potential well in advance of the equivalence point potential, and switch 48 to open at or only slightly in advance of the equivalence point potential, the delivery of titrant will be rapid at first, will be slowed as the equivalence point is approached, finally will proceed incremental-wise until the equivalence point is exactly reached, and will then stop. The position of the switches is easily adjusted by manually turning the drum 43 until the indicator registers the equivalence point potential for the particular reaction. Switch 48 is then locked in position to open at that precise point. The drum is next turned to correspond to a potential in advance of the equivalence point and switch 46 is clamped in position to open at that point.

In operation, as the potential of titration cell 30 changes, the response of potentiometer 44 causes drum 43 to rotate, carrying switches 46 and 48 with it. As the potential changes but slightly in the early stages of the titration the rotation of drum 43 will be correspondingly slight. However, as the titration approaches the equivalence point, it becomes desirable to reduce the titrant delivery rate which is accomplished by positioning switch 46 to open at some appropriate potential prior to the equivalence point potential. The opening of switch 46 breaks the short circuit thus placing resistance 49 into the power circuit and causing motor 18 to reduce speed. The titration then continues at reduced speed until the potential at which switch 48 is set, which may be the equivalence point potential or a slightly lower potential as hereinafter explained, is reached. At that point the opening of switch 48 opens the circuit of motor 18 thus stopping delivery of titrant.

It will readily be apparent that the concentration of titrant in cell 30 will be greatest in the region adjacent to outflow tip 32. Consequently while titrant is being delivered the titration will be at a more advanced stage and will accordingly produce a change in potential earlier in that region than elsewhere in the cell. It is a feature of my invention to utilize this region of advanced potential change close to outflow tip 32 to effect tentative approach to the equivalence point by incremental additions of titrant in the final stage of the titration to insure high accuracy. To this end I provide a movable support (not shown) whereby indicator electrode 34 may be positioned in contact with, or at any desired distance from, outflow tip 32 as necessitated by the conditions of the titration and thus be maintained at the point of advanced potential change. Although in some titrations the reaction is almost instantaneous, in others the reaction is relatively slow so that the area of highest titrant concentration does not necessarily coincide with the zone of advanced potential change. However in no titration of which I am aware will reaction fail to occur with increased potential difference before the titrant is dissipated throughout the titration vessel. The distance from outflow tip 32 at which indicator electrode 34 is placed will of course depend upon the speed of the particular reaction involved but will not ordinarily exceed about 3 cm.

The necessity of placing indicator electrode 34 in the optimum potential region becomes obvious when considering the operation of the apparatus of my invention in the final stage of the titration. Since, as I have said, the potential is most advanced in the zone adjacent outflow tip 32 the equivalence point potential will be reached there before the bulk of the solution is at the equivalence point and the resulting response by potentiometer 44 will cause the opening of switch 48 and thus stop delivery of titrant. With no further delivery of titrant the composition of the titrate solution is quickly equalized by stirring and the potential at indicator electrode 34 rapidly drifts backward. Drum 43 reverses direction with the potential drop causing switch 48 to close again and more titrant is added. With the addition of but a small amount of titrant the potential at indicator electrode 34 will again reach or, in some titrations, even exceed, the equivalence point, causing titrant delivery to stop again. This process continues to be repeated with the addition of increasingly smaller increments of titrant until the potential of the entire solution corresponds to the equivalence point and no further titrant is added. In some titrations there may be as many as a dozen or more incremental additions of titrant before the exact equivalence point is reached. This tentative approach to the equivalence point is illustrated in Fig. 3 by curve $y$ between points C and D, dashed line 52 representing the potential setting of switch 48 and dashed line 50 the equivalence point poetntial.

It is the tentative approach to and the stopping at substantially the exact equivalence point that constitute the principal objects and accomplishment of my invention. The specific means here shown by which these objects are accomplished are not critical. Although I have used mercury tip switches attached to the revolving drum 43 of the potentiometer 44 a proportional control device would serve as well. Also any other device which will interrupt a circuit at any given potential, such as an electronic trigger circuit, is equally effective.

In titrations such that the potential change is great at the equivalence point I have found it necessary to adjust switch 48 so that it will open at a value somewhat smaller than that potential due to the fact that a very minute quantity of titrant will cause a large increase in potential. The optimum setting of the switch 48 can easily be determined by trial in any given titration. When the rate of change of potential is large the difference between equivalence point and switch setting potentials should be correspondingly greater than when the rate of potential change at the equivalence point is small. In such latter case switch 48 may be set to open at the exact equivalence point potential. In any event the equivalence point will be approached tentatively.

Another feature of my invention is the use of a revolution counter to register the amount of titrant delivered in the course of the titration. The graduations marked on the barrel of syringe 2 are entirely inadequate for an accurate determination of the quantity of titrant expelled therefrom. Calibration of the instrument is easily effected by measuring the quantity of water delivered for any convenient number of counts of the counter and readily converted to unit volume per count. If a permanent record of each titration is desired a printing counter, of which there are several well known types, may be incorporated in the apparatus, thus further eliminating the possibility of human error.

That the apparatus and method of my invention may be used for all types of potentiometric and other electrometric titrations and with all possible types of electrode combinations will be evident from a consideration of the following examples illustrative of typical titrations of the most difficult type made thereby.

Example I.—Titrations of ferrous ion with ceric ion

In the reaction $Fe^{++}+Ce^{++++}=Fe^{+++}+Ce^{+++}$, which is rapid, the indicator electrode functions reversibly and the potential change at the equivalence point is very great. One-gram samples of pure ferrous ammonium sulfate hexahydrate were dissolved in approximately 200 cc. of 1 N sulfuric acid and titrated with 0.1 N ceric ammonium nitrate at room temperature with a platinum indicator electrode and a saturated calomel reference electrode. Because the reaction is very rapid electrode 34 was placed as close to outflow tip 32 as possible and switch 48 was set at +0.65 v. to anticipate the equivalence point voltage of +0.79 v. Four runs were made adding titrant at the rate of 1.3 cc. per minute and four at the titrant addition rate of 2.4 cc. per minute. In every case the initial flow of titrant was steady but as the equivalence point was approached titrant was added in small increments until the potential of the titration cell reached the equivalence point. Counter readings ranged between 4135 and 4145, averaging 25.39 cc. of ceric solution. Performing the same titration manually using o-phenanthroline ferrous ion indicator the equivalent volume of ceric solution was 25.40 cc. As an additional check on four automatic runs 0.1 cc. of 0.025 M o-phenanthroline ferrous ion indicator was added after the titrator stopped. In each case the addition of only 1–2 counts (equal to an average of 0.009 cc.) of ceric solution was sufficient to discharge the color.

Example II.—Titration of vanadyl ion with ceric ion

In the reaction $$VO^{++}+Ce^{++++}+H_2O=VO_2^{+}+Ce^{+++}+2H^{+}$$

which in dilute sulfuric acid solution proceeds rather slowly, the potential change at the equivalence point is small. Ten cc. portions of a 0.0958 N vanadyl sulfate solution were diluted to approximately 200 cc. and 5.6 cc. of concentrated sulfuric acid was added to provide a sulfuric acid concentration of 1 N. The solutions were titrated with 0.1002 N ceric ammonium nitrate solution at 80° C. using platinum indicator and saturated calomel reference electrodes. Delivery rate was 1.3 cc. per minute. Because of the slowness of the reaction indicator electrode 34 was placed about 2 cm. behind the outflow tip 32 and switch 48 was set at +0.95 v. to anticipate the equivalence point of +0.975 volt slightly. In three titrations of 24.98 cc. samples of vanadyl solution counter readings averaged 3894±4 or 23.88±0.02 cc. as compared to the theoretical value of 23.87 cc.

Example III.—Titration of chloride ion with silver ion

This titration involves a rapid reaction and reversible behavior of the indicator electrode, but a relatively small potential change at the equivalence point. A standard 0.1040 N silver nitrate solution was prepared determinately from pure silver and it contained a slight excess of nitric acid (ca. 0.05 N). A standard 0.05000 N sodium chloride solution was prepared determinately from pure sodium chloride. The concentrations of both solutions were known to better than 0.1%.

25 cc. of 0.05 N sodium chloride solution were diluted to approximately 200 cc. and titrated at room temperature with the silver solution. A silver wire was used as indicator electrode. A glass U-tube filled with 2 N potassium nitrate in 3% agar served as salt bridge between the saturated calomel reference electrode and the solution. The silver indicator electrode was placed virtually in contact with the outflow tip.

As the entire potential change is no more than about 0.3 volt during the complete course of a chloride-silver titration, the recorder was adjusted to a sensitivity of 40 cm. per volt (0.7 volt full scale) with a 100,000-ohm resistance in series with the titration cell.

Owing to the slight potential change at the equivalence point switch 48 was set to open at the exact equivalence point of +0.270 volt. In six titrations of 24.98 cc. portions of the 0.05 N sodium chloride solution at a delivery rate of 1.3 cc. per minute the counter readings ranging from 1952 to 1958 averaged 1956±1.7 equal to 11.99±0.01 cc. as compared with the theoretical amount of 12 cc. In three more of the same titrations and under the same conditions except for a titrant delivery rate of 4.1 cc. per minute the counts averaged 1958, equal to 12 cc. in exact agreement with the theoretical.

*Example IV.—Successive titrations of iodide and chloride with silver ion*

It is well known that in the manual argentimetric titration of iodide-chloride mixtures the iodide value tends to be too large and the chloride value correspondingly too small, because chloride ion coprecipitates with the silver iodide before the iodide equivalence point is reached. A 200 cc. solution containing 40 cc. of 0.05 N potassium iodide and 25 cc. of 0.05 N sodium chloride was titrated with 0.1 N silver nitrate. Ten grams of pure barium nitrate was added to minimize coprecipitation, which is a well-known effect. The titration conditions were the same as in Example III except that the potentiometer sensitivity was changed from 40 to 20 cm. per volt. Switch 48 was first set at 0.00 volt to anticipate the iodide equivalence point potential of +0.094 volt and delivery of titrant was at the rate of 2.4 cc. per min. After the equivalence point for the iodide titration was reached the counter reading was noted and switch 48 reset at the exact equivalence point potential +0.270 volt for the chloride titration. The counter reading for the iodide titration corresponded to 12.13 cc. as compared to the theoretical of 12 cc. and for the chloride titration corresponded to 11.85 cc. as compared to the theoretical of 12 cc. These results are fully equal in accuracy to those obtainable by manual titration, and the speed of titration was substantially greater.

*Example V.—Acid-base titrations—Titration of carbonate ion with hydrogen ion*

As a high resistance glass electrode is used in such titrations it is necessary to interpose a linear electronic amplifier between the titration cell and the potentiometer. I found that the line-operated, direct-reading Macbeth pH meter was easily adapted to this purpose. The potentiometer was connected in series with the indicating microammeter of the pH meter and the sensitivity adjusted so that the full scale of the potentiometer corresponded to 14 pH units. The introduction of the relatively low resistance of the potentiometer circuit did not alter the characteristics of the pH instrument.

A standard 0.02570 M sodium carbonate solution was prepared determinately from reagent quality sodium carbonate which had been dried at 300°, and a standard 0.1069 N hydrochloric acid solution was prepared from the constant-boiling acid. Measured volumes (usually 49.97 cc.) of the sodium carbonate solution were diluted to approximately 200 cc. in a 250-cc. beaker and titrated with the standard hydrochloric acid at a delivery rate of 2.4 cc. per minute. The initial concentration of carbonate ion was only about 0.006 M.

As this titration involves a very small potential change at the two equivalence points switch 48 was first set at pH 8.5 for the bicarbonate point of 8.3 and then after that portion of the titration was completed at pH 4.6 for the carbonic acid point of 4.5. The glass electrode was placed in direct contact with delivery tip 34. Four complete runs were made in which the average for the bicarbonate point was 1952±8 counts equal to 11.97±0.05 cc. as compared to the theoretical of 12.01 cc. and for the carbonic acid point was 3919±3 counts or 24.03±0.02 cc. as compared to the theoretical 24.02 cc.

It is apparent from the results obtained in the above examples, which are typical of the most difficult and exacting titrations, that I have obtained results on the apparatus and from the practice of the method of my invention which are at least the equal of the results obtainable by manual titration. I have obtained such highly accurate results consistently and without any sacrifice in speed. It is further evident that automatic titrations performed by the apparatus of my invention absorb less operator time than will the same titrations performed by the manual method.

Although the apparatus and process of my invention are particularly adapted to the performance of potentiometric titrations it will be evident to those skilled in the art that the other types of electrometric titrations, namely, amperometric and conductometric, may be performed thereby and such titrations are within the contemplation of this invention. Where potential responsive device 44 is utilized for potentiometric titrations, a current responsive device is used for the amperometric. Likewise in conductometric titrations a device to measure the resistance of the titrate to an imposed current may be substituted for potentiometer 44.

Having thus described my invention, what I claim as new and desire to secure by Letters Patent is:

1. An automatic electrometric titrator comprising a titration vessel, a titrant reservoir, means for expelling titrant therefrom, a titrant conduit from the reservoir to the titration vessel, a reference electrode and an indicator electrode in said vessel for producing a potential varying with the extent of titration, a potential responsive device electrically connected to said electrodes, a flow controller, control means including said potential responsive device for controlling said flow controller to vary the rate at which said titrant is expelled and to stop the expulsion of titrant in response to the detection by said potential responsive device of a predetermined potential coresponding with an equivalence point, supports, at least one of which is relatively adjustable with respect to the other, respectively supporting the outflow tip of said conduit and said indicator electrode in relative positions such that the indicator electrode is downstream of and at a distance no greater than about 3 centimeters from the outflow tip and in the zone of a more advanced stage of titration than that existing throughout the liquid in the titration vessel, the extent of the advance of titration in said zone being variable with the spacing between said tip and said indicator electrode, said control means in response to the potential derived from said zone of advanced titration decreasing the rate at which titrant is expelled prior to attainment of chemical equilibrium through the liquid in said titration vessel in avoidance of over-titration, and means to record the quantity of titrant expelled in bringing all of the liquid in the titration vessel substantially to said exact equivalence point.

2. An automatic electrometric titrator comprising, in combination, a syringe adapted to contain titrant, means to propel the plunger of the syringe, a titrant conduit having an outflow tip positioned below normal liquid level in the titration cell, a titration cell, stirring means therein, a reference electrode therein, an indicator electrode therein positioned at a distance no greater than about 3 centimeters downstream of the outflow tip and in the zone of advanced stage of titration, a potential responsive device electrically connected to the electrodes, control means in the power circuit to the plunger propulsion means actuated by the potential responsive device to control the operation of the syringe plunger propulsion means in response to the detection by the potential responsive device of predetermined potentials, and means mechanically connected to said plunger propulsion means to indicate the quantity of titrant expelled.

3. The apparatus of claim 2 in which the means for indicating the quantity of titrant expelled is a revolution counter geared to the plunger propulsion means.

4. An automatic electrometric titrator comprising, in combination, a titrant reservoir, positive displacement means for expelling titrant therefrom, a titration cell, stirring means therein, a titrant conduit between said reservoir and cell terminating in a capillary outflow tip positioned below normal liquid level in said cell, a reference electrode therein, an indicator electrode therein positioned at a distance no greater than about 3 centimeters downstream of the outflow tip and in the zone of advanced stage of titration, a potential responsive device electrically connected to said electrodes, control means for said titrant expulsion means associated with said potential responsive device to cause operation of the titrant expulsion means when the potential detected by the potential responsive device is different from a predetermined potential, to cause a reduction in the speed of operation of said titrant expulsion means when the difference between the detected potential and said predetermined potential is slight and to stop operation of said expulsion means when the potential detected is equal to said predetermined potential; and means to indicate the quantity of titrant expelled.

5. The apparatus of claim 4 in which the potential responsive device is a self-balancing potentiometer and the control means for the titrant expulsion means consists of at least one mercury tip switch in the power circuit to said titrant expulsion means actuated by the balancing mechanism of the potentiometer.

6. The apparatus of claim 4 in which the potential responsive device is a potentiometer and the control means for the titrant expulsion means consists of an electronic proportional control device.

7. The apparatus of claim 4 in which the potential responsive device is a potentiometer and the control means for the titrant expulsion means consists of an electronic trigger circuit.

8. An automatic electrometric titrator comprising, in combination, a titrant reservoir, means for expelling titrant therefrom, a titration cell, stirring means in said cell, a titrant conduit between said reservoir and cell and terminating in a capillary outflow tip positioned below normal liquid level in the cell, a reference electrode and an indicator electrode in said cell, a potential responsive device electrically connected to the electrodes, supports, at least one of which is relatively adjustable with respect to the other, respectively supporting the outflow tip of said conduit and the indicator electrode in the cell in relative placement such that the indicator electrode is at a distance no greater than about 3 centimeters downstream from the outflow tip whereby the indicator electrode will be bathed by solution in the cell at an advanced stage of the titration therein, control means including said potential responsive device (1) to permit the flow of power to said titrant expulsion means when the potential detected by the potential responsive device is different from a predetermined potential, (2) to reduce the flow of power to said expulsion means when the difference between the detected potential and said predetermined potential is slight and (3) to stop the flow of power to said expulsion means when the potential detected is equal to said predetermined potential; and means actuated by said titrant expulsion means to indicate the quantity of titrant expelled.

JAMES J. LINGANE.

References Cited in the file of this patent

FOREIGN PATENTS

| Number | Country | Date |
|--------|---------|------|
| 715,397 | Germany | Dec. 20, 1941 |

OTHER REFERENCES

Shenk et al.: Ind. and Eng. Chem., Anal. Ed., vol. 7, page 194 (1935).

Shaffer et al.: Ind. and Eng. Chem., Anal. Ed., July 1947, vol. 19, pages 492–494.

Berhenke.: Ind. and Eng. Chem., vol. 38, pages 544–546 (1946).